United States Patent [19]

Talbott

[11] 4,129,206

[45] Dec. 12, 1978

[54] CONTAINER ROTATING MEANS IN APPARATUS FOR CURING INKS AND DECORATIVE COATINGS

[75] Inventor: Roblee L. Talbott, Golden, Colo.

[73] Assignee: Coors Container Company, Golden, Colo.

[21] Appl. No.: 780,604

[22] Filed: Mar. 24, 1977

Related U.S. Application Data

[63] Continuation-in-part of Ser. No. 689,072, May 24, 1976, abandoned, which is a continuation of Ser. No. 567,604, Apr. 14, 1975, abandoned.

[51] Int. Cl.² .............................................. B65G 15/00
[52] U.S. Cl. ..................................... 198/377; 101/40; 101/407 R; 198/651; 403/2; 403/372; 403/292
[58] Field of Search ............... 198/344, 377, 477, 651, 198/678, 802; 101/38 R, 39, 40, 407 R; 250/453; 34/4, 105; 118/322; 403/2, 225, 292, 372

[56] References Cited

U.S. PATENT DOCUMENTS

| 503,803 | 4/1950 | Cremer et al. | 198/651 |
|---|---|---|---|
| 2,233,555 | 3/1941 | Reisinger | 425/272 |
| 2,563,181 | 8/1951 | Melmer | 198/651 |
| 2,796,164 | 6/1957 | Hakogi | 198/651 |
| 3,310,029 | 3/1967 | Ivanoff et al. | 118/230 |
| 3,846,030 | 11/1974 | Katt | 403/2 |
| 3,894,237 | 7/1975 | Choate et al. | 250/453 |
| 3,923,290 | 12/1975 | Tillis | 403/2 |

Primary Examiner—Joseph E. Valenza
Attorney, Agent, or Firm—Kyle W. Rost

[57] ABSTRACT

A conveyor carries a plurality of pegs for supporting and rotating cylindrical containers having one open end and one closed end, each peg having a central pin mounted in the conveyor and a steel sleeve rotatably carried on the pin, the steel sleeve extending for a maximum distance within the carried container for uniform support and stability of the container on the peg, and the steel material acting against the wall of the container to provide proper friction for container rotation with stability. The inner end of the sleeve has an enlarged hub for rolling on an associated bar for rotating the sleeve on the pin, and a spacer tube holds the open end of the carried container at a distance from the hub. In a modified form, the pin extends only a small fraction of the length of the sleeve and the sleeve is held on the outer end portion of the pin by friction, the sleeve being scored outwardly from the end of the pin to bend or break under stress without damaging the pin.

2 Claims, 4 Drawing Figures

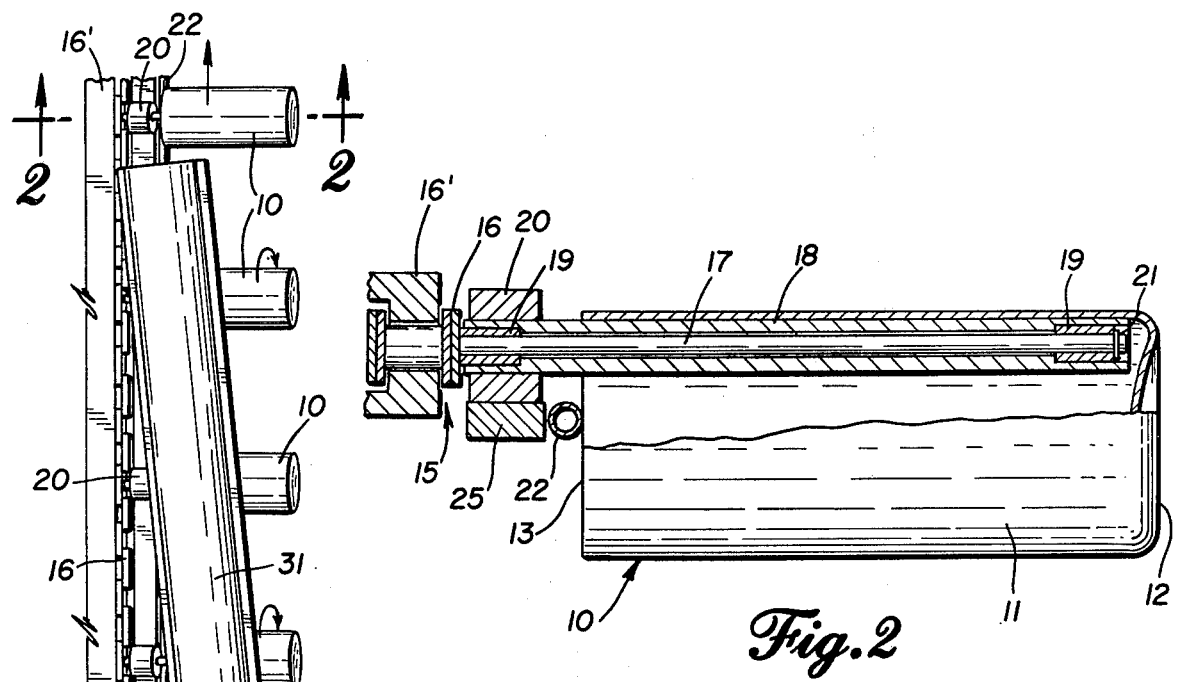
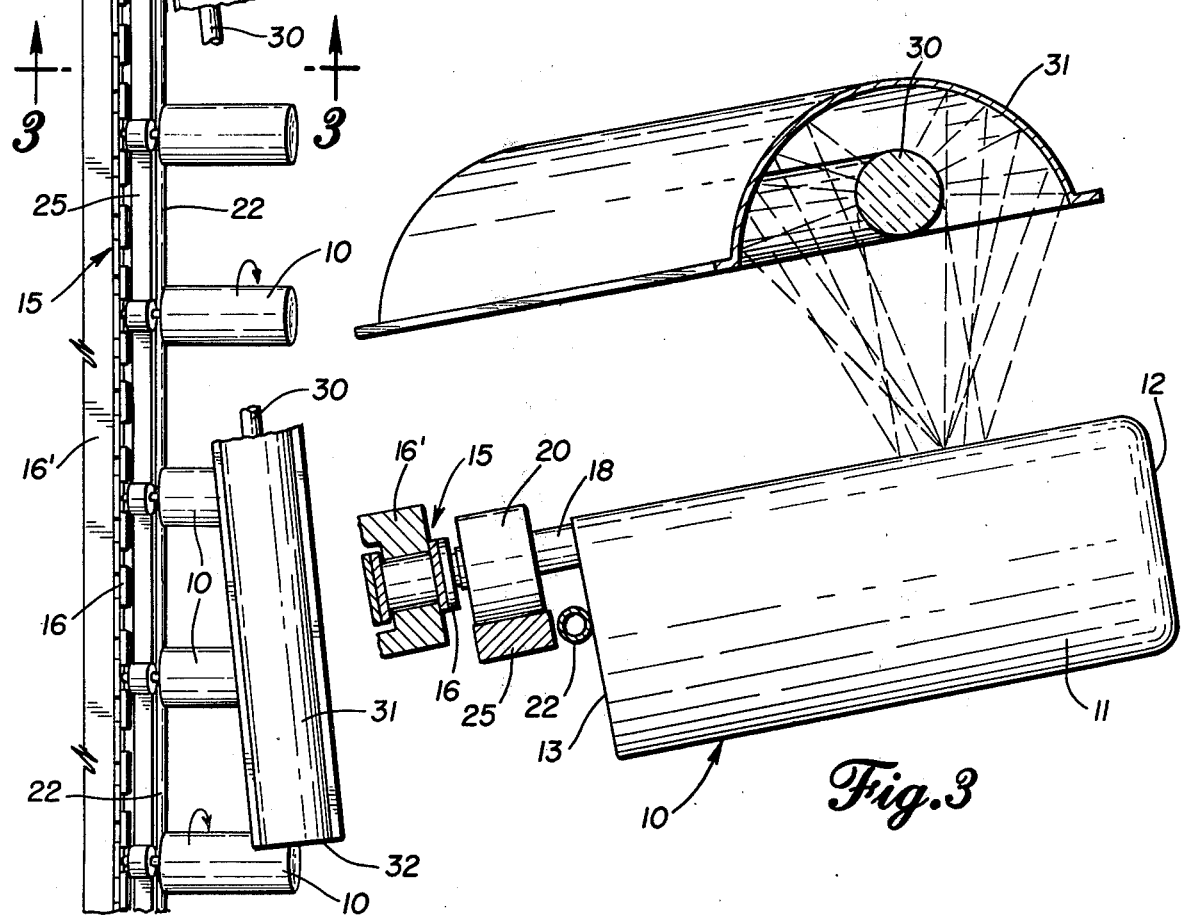

CONTAINER ROTATING MEANS IN APPARATUS FOR CURING INKS AND DECORATIVE COATINGS

CROSS-REFERENCES TO RELATED APPLICATIONS

This application is a continuation-in-part of Ser. No. 689,072, filed May 24, 1976 now abandoned, which is a continuation of Ser. No. 567,604, filed Apr. 14, 1975 now abandoned.

BACKGROUND OF THE INVENTION

1. Field of the Invention

The invention relates to equipment for handling cylindrical metal containers. More specifically, the invention is an improved apparatus for carrying and rotating metal can bodies having an open end and a closed end through an ultra violet curing oven.

2. Description of the Prior Art

With the development of inks that cure with ultra violet light, it became possible to apply decorative coatings to numerous types of containers with high speed, and to cure the coatings without having to evaporate solvents, which present an air pollution problem. Empirical studies indicated that the best and most rapid curing of ultra violet curing inks occurs when the ink is repeatedly exposed to UV radiation. Accordingly, a sheet of newspaper with UV curing inks may, for example, be passed under a plurality of transversely aligned UV lights to cure the inks through repeated exposure to radiation.

In the container arts, the first known curing apparatus for cylindrical containers having UV curing inks on their exterior wall utilized a simple belt conveyor on which the containers were placed endwise. The width of the belt was slightly narrower than the diameter of the container end so that the lip of the container also contacted a stationary support area adjacent the belt. As the belt moved the container linearly, the lip of the container end dragged against the stationary support area and induced axial rotation in the container. Printing machines using this type of belt system for curing inks were known to operate at curing speeds as high as three hundred units per minute. The problems of such a system are that each container must be balanced endwise on the belt, and the belt speed is limited by the need to keep the container balanced on its end as it travels through the UV oven.

Another attempt in the prior art is represented by the apparatus of U.S. Pat. No. 3,840,999 to Whelan. This apparatus used a well known and established can handling technique of mounting each container on a mandrel or brush, such as is commonly done in can decorators to both transport the can body and rotate the can body for printing. One problem with this type of machine is that mounting a can on a mandrel or brush is a fairly precise operation, and in can printers the mechanisms for accomplishing this task are the subject of a number of patents. Another problem is that in can printers the path of the can is limited to a simple circle in most cases, while the path through a UV curing oven is preferred to be a linear path of substantial length. Thus, a wheel holding the mandrels in predetermined positions for can loading is not a practical structure, while a linear conveyor that can travel through an oven is a practical structure but is extremely difficult to load with preciseness. A further problem is that unloading a brush or mandrel on a linear chain is quite difficult to accomplish without marring the can exterior. In can printers, the can is "blown off" the mandrel with air, but air manifolds are not easily connected to a moving roller chain, as they might be to a can carrying wheel in a printer.

U.S. Pat. No. 3,894,237 teaches a novel idea of mounting a can on a peg chain for rotation through an ultra violet curing oven. This structure offers the advantage of easy loading, as the pegs shown in the patent are substantially narrower than the inner diameter of the can and resemble the pins of well known pin-chain conveyors, as are commonly used in the art to move decorated cans away from a printing machine for drying of conventional solvent based inks. Similarly, the cans may be unloaded from the pegs with proven can handling equipment, as is well known in the prior art for use with pin-chain conveyors.

The problems of a peg chain conveyor are primarily ones of stability, since the cans must rotate on the peg in order or expose all sides of the cans to UV radiation. When a peg in a can first rotates, there is considerable instability as the surface of the peg attempts to drive the inner surface of the can essentially along a line of tangential contact. If the friction between the can and peg is too great, the peg will spin the can around the axis of the peg in highly unstable condition. Furthermore, the peg must contact the inside of the can only against the wall of the can and not against the bottom of the can, as unstability results if any rotational force upsets the rotational motion of the can around its own axis. Another problem is that friction between the peg and the can must be controlled to allow smooth and even rotation of the peg in the can, without sudden grabbing of the peg against the can wall, as has been found to cause a tossing or bouncing of the can on the peg.

A problem that can occur in any can carrying device but that is especially of concern in peg-chain style conveyor is that a can may not be fully mounted on the peg, and the extending portion of the can may contact a stationary part of the UV oven and bend or break the peg. Replacing a broken peg requires that the peg-chain be stopped, the central pin of the peg be forced out of the chain, and the new pin installed. This process can result in damage to the chain, as the pin is typically serving also as a hinge pin connecting the links of the chain. Thus, repair of a bent peg means separating the chain and may also result in some bending damage to the side plates of the chain links hinged on the pin.

The above problems, as well as others, are overcome in the present invention, which is an improvement over the rotating means disclosed in U.S. Pat. No. 3,894,237.

SUMMARY OF THE INVENTION

A conveyor chain such as a roller chain carries a plurality of pins on which are rotatably mounted steel sleeves, the pin plus sleeve forming a peg of substantially smaller diameter than the inner diameter of the cylindrical metal container to be supported and rotated thereon. At the inner end of the sleeve nearest the chain is an enlarged hub for contacting a bar adjacent to the chain, the rolling motion of the hub on the bar causing the sleeve to rotate on its axis on the pin as the chain moves. The length of the sleeve is such that the outer end of the sleeve terminates just prior to contacting the closed end of the carried container, and the open end of the container rides against a guide means for preventing the open end of the container from touching the enlarged hub of the sleeve and for keeping the outer end of the sleeve properly spaced from the closed end of the can. In a modified version of the peg, the inner pin is a chain pin of the conveyor chain and extends only partially into the can support sleeve. Rotatably mounted on the chain pin is a hub roller having an enlarged hub in its inner end and terminating at its outer end near the outer end of the pin. A can support sleeve is fastened over the hub roller and extends axially for a substantial distance beyond the termination of either the chain pin or hub roller, the can support sleeve having a scored portion axially outwardly from the termination of the hub roller to allow the sleeve to break easily if stressed.

The main object of the invention is to provide improved container rotating means in apparatus for curing inks and decorative coatings on containers by ultra violet light. The rotating means comprises a conveyor-carried pin surrounded by a steel sleeve which extends all the way to the free end of the pin, and provides maximum support for the can, from the center of gravity to the closed end of the can, and provides maximum stability along the length of the can.

Another object is to provide container rotating means comprising steel sleeves with bushings at each end, each sleeve having a steel hub pressed on the sleeve providing rotation of the sleeve which provides sufficient driving friction between the container and sleeve to create the necessary rotation of the can when the sleeve is rotated.

Another object is to produce means for preventing the closed end of the container from contacting the container rotating means, such that all frictional driving forces are restricted to the side of the sleeve and the side of the can, to provide maximum rotational stability of the can.

A further object is to provide a peg-chain that allows the pegs to be easily and rapidly repaired if one should become bent or broken. The break-away sleeve of the present invention prevents unusual stresses on the peg from damaging the pin on which the peg rotates and allows the damaged sleeve to be replaced without separating the chain or damaging the side plates of the chain.

BRIEF DESCRIPTION OF THE DRAWINGS

FIG. 1 is a plan view of container rotating means embodying the invention in apparatus for curing inks and decorative coatings on containers, showing a plurality of such containers mounted on a peg-chain type conveyor moving past an ultra violet lamp mounted in a reflector.

FIG. 2 is an elevational view, partly in section, in the plane of the line 2—2 of FIG. 1, on an enlarged scale, of one of the containers mounted on a peg and showing also the means for rotating the container.

FIG. 3 is a transverse sectional view on an enlarged scale, in the plane of the line 3—3 of FIG. 1.

DESCRIPTION OF THE PREFERRED EMBODIMENT

Figure 4:
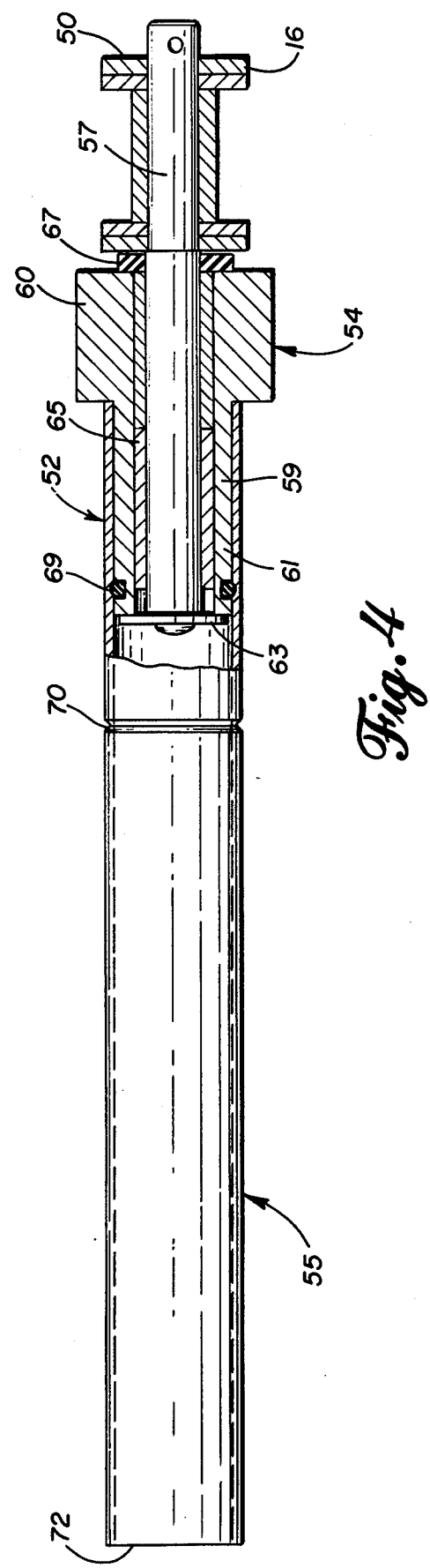
FIG. 4 is an elevational view of a modified peg in partial section.

In the embodiment shown in the drawings, the invention has been applied to cans 10 each having a cylindrical body 11 and an integrally formed closed end 12. The opposite end 13 is open. The cans 10 have been decorated externally on their bodies 11 in a printer (not shown) in which the cans are transferred from the printing mechanism to a peg-chain type conveyor 15 comprising a chain 16, chain guide 16', and a conventional pin 17 which is the center of the peg of this invention. The pin 17 is covered by a steel sleeve 18 mounted on brass bushings 19. A steel hub 20 is pressed onto the steel sleeve 18 for the purpose of decreasing rotational speed of the sleeve. The steel sleeve 18 extends from the inner end of the pin 17, near the chain 16, to the outer end of the pin, which is near but not contacting the closed end 12 of the can 10. The sleeve 18 is retained by any suitable means 21 on the end of the pin 17.

A round tube or a bar 22 is mounted in a position adjacent the open end of the can 10 to hold the open end of the can at a given distance from the center line of the conveyor chain path, or at a given distance from the end of the sleeve 18 to prevent the end of the sleeve from contacting the inner surface of the closed bottom 12 of the can.

The steel hub 20 pressed on the inner end of the steel sleeve 18 is contacted by a bar 25 which may be stationary or a moving surface for the purpose of rotating the peg sleeve 18 on the pin 17 while the conveyor chain 16 is moving past the bar 25. Thus rotary motion is transmitted to the sleeve 18 and the can 10.

The container rotating means of this invention is shown in apparatus for curing inks and decorative coatings on containers by ultra violet light. The source of ultra violet light is the lamp tube 30, mounted in a reflector 31 in a frame 32. This assembly is located in an oven (not shown). The ultra violet light assembly is disposed at a slight angle to the conveyor chain and the cans mounted on the pegs. The result is that bands of concentrated ultra violet light are beamed on the cans progressively in a helical pattern on the sides alternately exposed to the light rays reflected by the reflector 31. The rotary movement of the cans on their peg supports results in interrupted application of ultra violet on the can surfaces thus alternately exposed to the lamp 30. Experiments indicate that the curing effectiveness of the ultra violet is enhanced by interrupting or "chopping" the light beams. This enhancement is achieved by this invention by the interrupted exposure of the surfaces of the cans to the light beams due to rotation of the cans.

As shown in the drawings, the angle of the ultra violet lamp assembly to the path of travel of the conveyor 15 and containers 10 mounted thereon, is approximately 10 degrees, but this may vary according to the speed of travel of the conveyor, the length of the cans, and the time required to effect the curing of the decorated surfaces of the containers 10. The conveyor 15 is tilted slightly as shown in FIG. 3, to keep the cans on the pegs.

The sleeve 18 extends all the way from the inner end of the pin 17 to the outer end thereof. This provides maximum support for the can from the center of gravity to the closed end of the can, and maximum can stability along the length of the can. The steel surface of the sleeve 18 provides sufficient driving friction between the can and sleeve to create the necessary rotation. The tube or rod 22 prevents the end of the sleeve 18 from contacting the closed end of the can and thereby eliminates frictional drive between the end of the sleeve and closed end of the can.

Because the peg is of smaller diameter than the inner diameter of the carried can 10, the can is free to move axially on the peg, in contrast to the tight fit of the can on a form fitting mandrel in many conventional types of can handling systems. The loose fit of the can on the peg allows the present invention to be used with proven can handling apparatus for loading and unloading cans on pin-chain conveyors, as are well known in the art. At the same time, the loose fit may allow a can 10 to work its way axially outwardly on the peg to a point where the can 10 will strike a stationary object and, in turn, cause damage to the peg. With the peg shown in FIG. 2, the damage may be a bent pin or a broken pin, with the bend or break commonly occurring at the inner end of sleeve 18 adjacent to chain 16. In the case of either a bent or broken pin, the pin should be immediately repaired, as a bent pin cannot properly rotate and support a can, and a broken pin will lead to the loss of a decorated can each time the pin should receive such a can from associated loading apparatus. As shown in FIG. 2, pin 17 extends at its base directly into chain 16 and serves as the chain pin, requiring that chain 16 be split when the base of a broken or bent pin 17 is removed for adding a replacement peg. This process requires that the pin be driven from the chain, often producing some bending of chain side plates 50, FIG. 4. In addition, splitting the chain 16 results in unnecessary loss of operating time while the chain is rejoined.

The modified peg 52 shown in FIG. 4 is designed to prevent damage to the pin when a carried can strikes an exterior object, and is also designed for rapid repair of a damaged peg. Modified peg 52 has a hub assembly 54 and a steel sleeve 55 that are joined together by any means allowing easy removal and replacement of the sleeve on the hub; for example a friction fastened socket relationship. Hub 54 has chain pin 57 at its center and extending inwardly into chain 16 as in the prior embodiment. Pin 57 extends outwardly from the chain only a relatively short distance with respect to peg 52 and carries hub roller 59 covering substantially the entire length of the pin outwardly from the chain 16. An enlarged hub 60 similar to hub 20 is at the inner end of hub roller 59, and a portion 61 of relatively smaller diameter extends axially outwardly from hub 60 to the outward end of pin 57, where retaining means 63 prevents the hub roller 54 from moving axially outwardly on pin 57. Hub roller 54 may freely rotate around the axis of pin 57, and bushing 65 and thrust washer 67 may be used to reduce friction between the hub roller and, respectively, pin 57 and chain 16.

Portion 59 fits into cylindrical sleeve 55 in a socketed relationship, allowing the sleeve to be removed and replaced by simply pulling the old sleeve off the hub roller and pushing a new sleeve in place. The outer end of portion 61 may have a groove containing o-ring 69 for good frictional fit with sleeve 55 which has a corresponding inner groove to receive the o-ring. Axially outwardly from the end of pin 57, sleeve 55 has annular score 70 creating a frangible area in the length of the sleeve. When unusual stress is applied to the sleeve, it will bend or break at score line 70 and will not transmit damaging force to pin 57. The peg 52 may then be repaired by pulling the remaining portion of sleeve 55 from hub assembly 54 and placing a new sleeve on the hub assembly. The chain need not be split and chain side plates 50 are not subjected to having pin 57 driven out for a simple sleeve replacement.

The relative position of score line 70 and the termination of pin 57 and hub roller 59 are not critical, but, in one preferred embodiment, sleeve 55 is approximately 5½ inches long and score line 70 is approximately 1½ inches from the inner end of the sleeve; pin 57 and hub roller 59 extend approximately one inch into the sleeve. If a longer sleeve is needed, the outer end of the sleeve can be extended without altering the positions of the score line and termination points of the pin and hub roller within the sleeve. This preferred embodiment is well suited for use with a can 10 having a side wall approximately 5¼ inches in height and having a diameter of approximately 2½ inches. With such a can, the sleeve may have an exterior diameter of approximately one-half inch.

The embodiment of FIG. 4 has all of the advantages of the peg shown in FIG. 2, including the squarely terminating outward end 72 for avoiding contact with the closed end 12 of a carried can. The friction created between sleeve 55 and hub roller 59 by o-ring 69 causes the sleeve to rotate with the hub roller at all times of normal operation. The loose fit between the sleeve and carried can allows slippage between the two and avoids applying heavy torque to the union of the sleeve and hub roller. Even at times when the sleeve is initially accelerating the can in rotation, there are no excessive forces applied to the o-ring. An apparatus having a form-fitting mandrel carrying a can for rotation would require a substantially more permanent union to a roller hub to avoid rapid deterioration of the o-ring, and accordingly, could not offer the speedy repair made possible with the break away sleeve of FIG. 4.

I claim:

1. An improved peg structure for use in container rotating apparatus of the kind having a moving conveyor chain carrying a plurality of pegs, each having a center pin mounted at an inner end as a chain pin on the conveyor and having a sleeve rotatably carried by the pin for being received in and carrying a cylindrical container of substantially larger diameter than the sleeve, and having frictional sleeve rotating means associated with the container rotating apparatus, wherein the improvement comprises:

(a) a hub roller rotatably mounted on said pin, terminating axially outwardly near the outer end of the pin, and having an exterior groove near the outer end thereof transverse to the hub roller axis;

(b) wherein said sleeve is engaged over a portion of the hub roller including said hub roller groove, which portion is relatively short relative to the length of the sleeve for supporting the sleeve;

(c) said sleeve having a frangible annular score line located axially outwardly from the outward end of the hub roller for allowing the sleeve to break in response to unusual bending stress without damaging the hub roller, and having an inner sleeve groove adapted to overlie said hub roller groove; and (d) a resilient member mutually engaged in said hub roller groove and said inner sleeve groove for preventing unauthorized relative axial motion between the hub roller and sleeve.

2. The improved peg structure of claim 1, wherein said resilient member comprises an O-ring.

* * * * *